US011663912B2

(12) United States Patent
Mubarek et al.

(10) Patent No.: US 11,663,912 B2
(45) Date of Patent: *May 30, 2023

(54) METHOD, APPARATUS, AND SYSTEM FOR AUTOMATIC ROAD CLOSURE DETECTION

(71) Applicant: HERE GLOBAL B.V., Eindhoven (NL)

(72) Inventors: Omer Mubarek, Chicago, IL (US); Colin Watts-Fitzgerald, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 208 days.

This patent is subject to a terminal disclaimer.

(21) Appl. No.: 17/102,044

(22) Filed: Nov. 23, 2020

(65) Prior Publication Data

US 2021/0142668 A1  May 13, 2021

Related U.S. Application Data

(63) Continuation of application No. 16/155,649, filed on Oct. 9, 2018, now Pat. No. 10,847,029.

(51) Int. Cl.
*G08G 1/0967* (2006.01)
*G08G 1/00* (2006.01)
(Continued)

(52) U.S. Cl.
CPC ... *G08G 1/096766* (2013.01); *G01C 21/3694* (2013.01); *G06F 16/29* (2019.01)

(58) Field of Classification Search
CPC .......... G08G 1/0967; G08G 1/00; G08G 1/01; G08G 1/017; G08G 1/0141; G06Q 10/02; G06F 16/29
See application file for complete search history.

(56) References Cited

U.S. PATENT DOCUMENTS 7,623,963 B2  11/2009 Nomura
8,731,808 B2   5/2014 Tashiro et al.
(Continued)

FOREIGN PATENT DOCUMENTS

WO     2017009466 A1   1/2017

OTHER PUBLICATIONS

Wang et al., "Road Traffic Anomaly Detection via Collaborative Path Inference from GPS Snippets", Article, Published in Sensors, Mar. 9, 2017, pp. 1-21.

(Continued)

*Primary Examiner* — Yuri Kan
(74) *Attorney, Agent, or Firm* — Ditthavong, Steiner & Mlotkowski

(57) ABSTRACT

An approach is provided for automatic road closure detection. The approach, for example, involves designating a dynamic time window comprising one or more time epochs ending before a current time epoch. The approach also involves retrieving a first set of probe data collected from a road link during the dynamic time window. The approach further involves adjusting a size of the dynamic time window by adding or removing another time epoch ending before the current time epoch until at least one criterion related to the probe data, the dynamic time window, or a combination thereof is met. The approach further involves extracting a plurality of features from the first set of probe data, from a second set of probe data collected from the road link during the current time epoch, or a combination thereof. The approach then involves detecting a closure status of the road link based on the plurality of features.

20 Claims, 15 Drawing Sheets

(51) Int. Cl.
    *G08G 1/01*      (2006.01)
    *G08G 1/017*     (2006.01)
    *G06Q 10/02*     (2012.01)
    *G06F 16/29*     (2019.01)
    *G01C 21/36*     (2006.01)

(56) References Cited

U.S. PATENT DOCUMENTS

| | | | |
|---|---|---|---|
| 9,091,561 B1 | 7/2015 | Weir | |
| 9,696,169 B2 | 7/2017 | Johnson et al. | |
| 9,818,295 B2 | 11/2017 | Kesting et al. | |
| 10,847,029 B2 * | 11/2020 | Mubarek | G06F 16/29 |
| 2004/0144186 A1 * | 7/2004 | Ketley | G08G 1/0175 |
| | | | 73/865.9 |
| 2013/0325521 A1 * | 12/2013 | Jameel | G06Q 10/02 |
| | | | 705/5 |
| 2013/0345955 A1 * | 12/2013 | Tashiro | G08G 1/00 |
| | | | 701/118 |
| 2014/0278055 A1 | 9/2014 | Wang et al. | |
| 2015/0379870 A1 * | 12/2015 | Neuman | G08G 1/017 |
| | | | 340/941 |
| 2016/0247397 A1 * | 8/2016 | Xu | G08G 1/0141 |
| 2016/0275787 A1 * | 9/2016 | Kesting | G01C 21/32 |
| 2016/0284212 A1 * | 9/2016 | Tatourian | G08G 1/096725 |

OTHER PUBLICATIONS

Office Action for corresponding European Patent Application No. 19202055.0-1203, dated Mar. 24, 2020, 8 pages.

* cited by examiner

FIG. 6

| Actual Volume (601) | 0 | 1 | 1 | 2 | 1 | 3 | 2 | 1 | 1 | 0 |
|---|---|---|---|---|---|---|---|---|---|---|
| Historic Volume (603) | 3 | 3 | 2 | 2.5 | 5 | 4 | 2 | 1 | 0 | 0 |
| Epochs | $e_0$ | $e_1$ | $e_2$ | $e_3$ | $e_4$ | $e_5$ | $e_6$ | $e_7$ | $e_8$ | $e_9$ |

FIG. 7

| Actual Volume (601) | 0 | 1 | 1 | 2 | 1 | 3 | 2 | 1 | 1 | 0 |
|---|---|---|---|---|---|---|---|---|---|---|
| Historic Volume (603) | 3 | 3 | 2 | 2.5 | 5 | 4 | 2 | 1 | 0 | 0 |
| Epochs | $e_0$ | $e_1$ | $e_2$ | $e_3$ | $e_4$ | $e_5$ | $e_6$ | $e_7$ | $e_8$ | $e_9$ |

701 (highlights $e_0$ column)

FIG. 8

| Actual Volume (601) | 0 | 1 | 1 | 2 | 1 | 3 | 2 | 1 | 1 | 0 |
|---|---|---|---|---|---|---|---|---|---|---|
| Historic Volume (603) | 3 | 3 | 2 | 2.5 | 5 | 4 | 2 | 1 | 0 | 0 |
| Epochs | $e_0$ | $e_1$ | $e_2$ | $e_3$ | $e_4$ | $e_5$ | $e_6$ | $e_7$ | $e_8$ | $e_9$ |

801, 701

Sum = 3

FIG. 9

| Actual Volume (601) | 0 | 1 | 1 | 2 | 1 | 3 | 2 | 1 | 1 | 0 |
|---|---|---|---|---|---|---|---|---|---|---|
| Historic Volume (603) | 3 | 3 | 2 | 2.5 | 5 | 4 | 2 | 1 | 0 | 0 |
| Epochs | $e_0$ | $e_1$ | $e_2$ | $e_3$ | $e_4$ | $e_5$ | $e_6$ | $e_7$ | $e_8$ | $e_9$ |

801, 701

Sum = 6

FIG. 10

| Actual Volume (601) | 0 | 1 | 1 | 2 | 1 | 3 | 2 | 1 | 1 | 0 |
|---|---|---|---|---|---|---|---|---|---|---|
| Historic Volume (603) | 3 | 3 | 2 | 2.5 | 5 | 4 | 2 | 1 | 0 | 0 |
| Epochs | $e_0$ | $e_1$ | $e_2$ | $e_3$ | $e_4$ | $e_5$ | $e_6$ | $e_7$ | $e_8$ | $e_9$ |

801 encompasses $e_0$–$e_2$; 701 highlights $e_3$.

Sum = 8

FIG. 11

| Actual Volume (601) | 0 | 1 | 1 | 2 | 1 | 3 | 2 | 1 | 1 | 0 |
|---|---|---|---|---|---|---|---|---|---|---|
| Historic Volume (603) | 3 | 3 | 2 | 2.5 | 5 | 4 | 2 | 1 | 0 | 0 |
| Epochs | $e_0$ | $e_1$ | $e_2$ | $e_3$ | $e_4$ | $e_5$ | $e_6$ | $e_7$ | $e_8$ | $e_9$ |

801 encompasses $e_0$–$e_3$; 701 highlights $e_4$.

Sum = 10.5

FIG. 12

| | $e_0$ | $e_1$ | $e_2$ | $e_3$ | $e_4$ | $e_5$ | $e_6$ | $e_7$ | $e_8$ | $e_9$ |
|---|---|---|---|---|---|---|---|---|---|---|
| 601 — Actual Volume | 0 | 1 | 1 | 2 | 1 | 3 | 2 | 1 | 1 | 0 |
| 603 — Historic Volume | 3 | 3 | 2 | 2.5 | 5 | 4 | 2 | 1 | 0 | 0 |
| | | | | | | | | | | |
| Epochs | | | | | | | | | | |

801 brackets $e_1$–$e_4$; 701 brackets $e_5$. Sum = 12.5

FIG. 13

| | $e_0$ | $e_1$ | $e_2$ | $e_3$ | $e_4$ | $e_5$ | $e_6$ | $e_7$ | $e_8$ | $e_9$ |
|---|---|---|---|---|---|---|---|---|---|---|
| 601 — Actual Volume | 0 | 1 | 1 | 2 | 1 | 3 | 2 | 1 | 1 | 0 |
| 603 — Historic Volume | 3 | 3 | 2 | 2.5 | 5 | 4 | 2 | 1 | 0 | 0 |
| | | | | | | | | | | |
| Epochs | | | | | | | | | | |

801 brackets $e_1$–$e_5$; 701 brackets $e_6$. Sum = 11.5

FIG. 14

|  | $e_0$ | $e_1$ | $e_2$ | $e_3$ | $e_4$ | $e_5$ | $e_6$ | $e_7$ | $e_8$ | $e_9$ |
|---|---|---|---|---|---|---|---|---|---|---|
| 601 — Actual Volume | 0 | 1 | 1 | 2 | 1 | 3 | 2 | 1 | 1 | 0 |
| 603 — Historic Volume | 3 | 3 | 2 | 2.5 | 5 | 4 | 2 | 1 | 0 | 0 |
| Epochs |  |  |  |  |  |  |  |  |  |  |

Sum = 11

(regions 801 covering $e_4$–$e_6$ and 701 covering $e_7$)

FIG. 15

|  | $e_0$ | $e_1$ | $e_2$ | $e_3$ | $e_4$ | $e_5$ | $e_6$ | $e_7$ | $e_8$ | $e_9$ |
|---|---|---|---|---|---|---|---|---|---|---|
| 601 — Actual Volume | 0 | 1 | 1 | 2 | 1 | 3 | 2 | 1 | 1 | 0 |
| 603 — Historic Volume | 3 | 3 | 2 | 2.5 | 5 | 4 | 2 | 1 | 0 | 0 |
| Epochs |  |  |  |  |  |  |  |  |  |  |

Sum = 12

(region 801 covering $e_4$–$e_7$ and 701 covering $e_8$)

FIG. 16

| Actual Volume | 0 | 1 | 1 | 2 | 1 | 3 | 2 | 1 | 1 | 0 |
|---|---|---|---|---|---|---|---|---|---|---|
| Historic Volume | 3 | 3 | 2 | 2.5 | 5 | 4 | 2 | 1 | 0 | 0 |
| Epochs | $e_0$ | $e_1$ | $e_2$ | $e_3$ | $e_4$ | $e_5$ | $e_6$ | $e_7$ | $e_8$ | $e_9$ |

Sum = 12

METHOD, APPARATUS, AND SYSTEM FOR AUTOMATIC ROAD CLOSURE DETECTION

RELATED APPLICATION

This application is a continuation of and claims priority from U.S. patent application Ser. No. 16/155,649, entitled "METHOD, APPARATUS, AND SYSTEM FOR AUTOMATIC ROAD CLOSURE DETECTION," filed on Oct. 9, 2018, the contents of which are hereby incorporated herein in their entirety by this reference.

BACKGROUND

Providing data on traffic incidents (e.g., abnormalities in traffic that can affect traffic flow such as accidents, lane closures, road closures, etc.) is an important function for map service providers. In particular, while most traffic incidents can have at least some negative impact on traffic, road closures can be the most severe because no cars can go through the affected roadway. The lack of knowledge about a road closure can have enormous negative impact on trip planning, routing, and estimated time of arrival. Therefore, traffic service providers face significant technical challenge to detecting road closures accurately.

SOME EXAMPLE EMBODIMENTS

Therefore, there is a need for automatic road closure detection.

According to one embodiment, a computer-implemented method comprises designating a dynamic or static time window comprising one or more time epochs ending before a current time epoch. The method also comprises retrieving a first set of probe data collected from a road link during the dynamic or static time window. In an embodiment that uses a dynamic time, the method further comprises adjusting a size of the dynamic time window by adding or removing another time epoch ending before the current time epoch until at least one criterion related to the probe data, the dynamic time window, or a combination thereof is met. The method further comprises extracting a plurality of features from the first set of probe data, from a second set of probe data collected from the road link during the current time epoch, or a combination thereof The method further comprises detecting a closure status of the road link based on the plurality of features.

According to another embodiment, an apparatus comprises at least one processor, and at least one memory including computer program code for one or more computer programs, the at least one memory and the computer program code configured to, with the at least one processor, cause, at least in part, the apparatus to designate a dynamic or static time window comprising one or more time epochs ending before a current time epoch. The apparatus is also caused to retrieve a first set of probe data collected from a road link during the dynamic or static time window. In an embodiment that uses a dynamic time, the apparatus is further caused to adjust a size of the dynamic time window by adding or removing another time epoch ending before the current time epoch until at least one criterion related to the probe data, the dynamic time window, or a combination thereof is met. The apparatus is further caused to extract a plurality of features from the first set of probe data, from a second set of probe data collected from the road link during the current time epoch, or a combination thereof. The apparatus is further caused to detect a closure status of the road link based on the plurality of features.

According to another embodiment, a non-transitory computer-readable storage medium carries one or more sequences of one or more instructions which, when executed by one or more processors, cause, at least in part, an apparatus to designate a dynamic or static time window comprising one or more time epochs ending before a current time epoch. The apparatus is also caused to retrieve a first set of probe data collected from a road link during the dynamic or static time window. In an embodiment that uses a dynamic time, the apparatus is further caused to adjust a size of the dynamic time window by adding or removing another time epoch ending before the current time epoch until at least one criterion related to the probe data, the dynamic time window, or a combination thereof is met. The apparatus is further caused to extract a plurality of features from the first set of probe data, from a second set of probe data collected from the road link during the current time epoch, or a combination thereof. The apparatus is further caused to detect a closure status of the road link based on the plurality of features.

According to another embodiment, an apparatus comprises means for designating a dynamic or static time window comprising one or more time epochs ending before a current time epoch. The apparatus also comprises means for retrieving a first set of probe data collected from a road link during the dynamic or static time window. In an embodiment that uses a dynamic time, the apparatus further comprises means for adjusting a size of the dynamic time window by adding or removing another time epoch ending before the current time epoch until at least one criterion related to the probe data, the dynamic time window, or a combination thereof is met. The apparatus further comprises means for extracting a plurality of features from the first set of probe data, from a second set of probe data collected from the road link during the current time epoch, or a combination thereof. The apparatus further comprises means for detecting a closure status of the road link based on the plurality of features.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6-16 are diagrams illustrating the creation of a dynamic time window or a series of time epochs, according to one embodiment;

DESCRIPTION OF SOME EMBODIMENTS

Examples of a method, apparatus, and computer program for automatic road closure detection are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
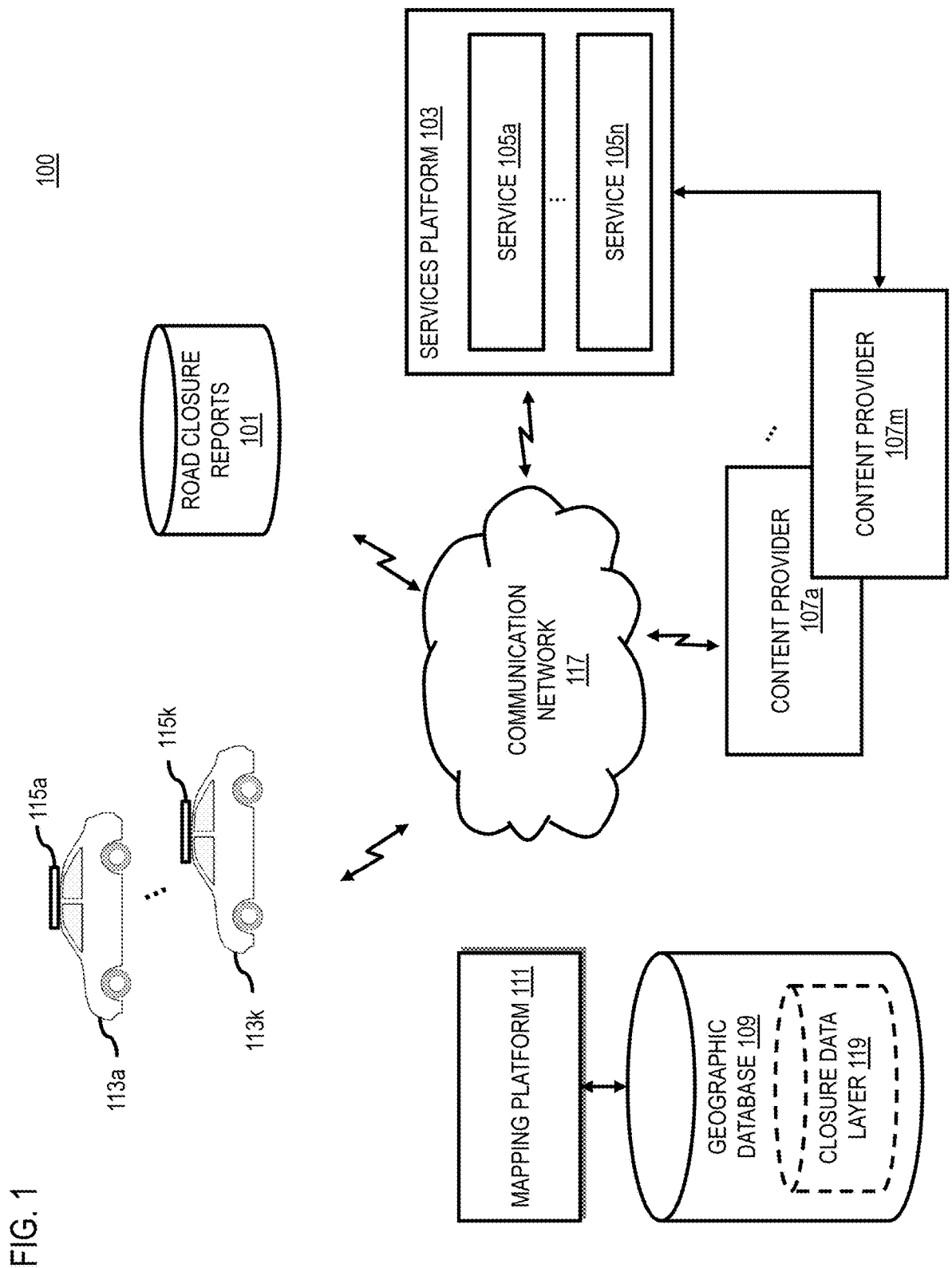
FIG. 1 is a diagram of a system capable of automatic road closure detection, according to one embodiment.

FIG. 1 is a diagram of a system 100 capable of automatically verifying road closure reports, according to one embodiment. Generally, traffic incidents such as road closures (e.g., road closure reports 101) are published by government/municipality agencies, local police, and/or third-party official/semi-official sources (e.g., a services platform 103, one or more services 105a-105n, one or more content providers 107a-107m, etc.). By way of example, the published road closure reports 101 can specify the roadway (e.g., by name or matched to specific road link records of digital map data such as a geographic database 109) that has been closed or partially closed to traffic (e.g., vehicular and/or non-vehicular traffic). Closure refers, for instance, to restricting traffic flow on a particular roadway such that no vehicle or a reduced number of vehicle (e.g., reduced with respect to an average free flow traffic volume on the roadway) is permitted or able to travel on the roadway. In one embodiment, a traffic provider (e.g., via a mapping platform 111) monitors the feeds of the road closures reports 101, extracts the affected roadways, and provides traffic data and/or other functions based on the road closure reports 101 (e.g., displays the location of reported closures on the map, generates navigation routes to avoid reported road closures, etc.). Then, traditional traffic service providers wait for another message or road closure report 101 indicating that the road has opened to provide updated data and/or functions. In other words, traditional traffic service providers have historically placed total reliance on these road closure reports 101.

However, several potential issues can arise from this over reliance on road closure reports 101 and result in providing poor quality data and/or poor user experiences for users of the traffic service. One issue, for instance, relates to third-party traffic service providers historically have not offering complete/comprehensive coverage (e.g., road closure data may be missing or not reported for all road links in an area or interest or digital map). Another issue is that the road closure report 101 could be wrong; i.e., the reported road segment is actually not closed. In another scenario, the road closure report 101 might be inaccurate in time and/or location. For example, the road closure report 101 may have been based on a construction-scheduled closure with predetermined start and end times. However, the scheduled closure may have started and/or ended at a different time than specified in the schedule. In yet another scenario, the road closure report 101 could be due to an unscheduled event, and the provider or source of the report 101 could be very late to publish the expiration of the closure event, miss publishing the expiration of the closure (e.g., the re-opening of the road) completely, or not have any data on the closure status (e.g., open or closed) for all road segments or links.

To supplement and correct these issues, the system 100 introduces a capability to use probe data collected from vehicles 113a-113k (also collectively referred to as vehicles 113) to automatically detect road closures as well as fix road closures that have opened. By way of example, the probe data can include, at least in part, location data sampled from the respective location sensors 115a-115k (also collectively referred to sensors 115, such as GPS sensors, compasses, accelerometers, gyroscopes, etc.). The calculated vehicle paths are then mapped onto the roadway graph or closure link graph including the road segments of interest. In particular, the embodiments described herein solve the problem of automatically detecting road closures on a variety of road types/vehicle volume densities. In one embodiment, the system 100 dynamically adapts the time horizon that the system 100 considers when identifying a closure based on, e.g., specific features or models of each unique or individual road segment.

In one embodiment, the system 100 takes every road segment of interest (e.g., up to and including all road segments represented in the digital map of the geographic database 109 or subset thereof) and monitors probe data (e.g., GPS probe data) that travels through the segments (e.g., segments indicated by vehicle paths created from the probe data). The system 100 then creates a dynamic/adaptive time window (or alternatively a static time window) by which to monitor for each roadway segment based on historical models (e.g., models of vehicle probe volume or equivalent probe attribute) previously generated for every roadway segment of interest. As no prior knowledge of a closure is assumed, the embodiments described herein can be used to monitor all existing roadways (or some defined subset thereof) constantly. This monitoring, however, can create an enormous resource load on any system. Therefore, in one embodiment, the system 100 extracts a very lightweight but relevant set of features which can be used indicate an anomaly (e.g., a road closure or other traffic incident) with a monitored road.

In one embodiment, the result is a process for computing a closure probability for each monitored roadway segment. If the probability breaks a flagging threshold, this closure information "flag" is passed on as a potential closure. Conversely, in some embodiments, if the probability does not break the flagging threshold, the system 100 can flag the monitored road segment as potentially opened (or re-opened if the road segment was previously flagged as potentially closed).

The embodiments of automatic closure detection described herein provide for several technical advantages including but not limited to:

1. The system 100 provides for automated monitoring of a given set of road segments to determine if the road segments are open or closed to traffic without human intervention. Hence, it replaces traditional manual efforts to discover road closures. Therefore, it reduces human error and frees up human resources for other tasks.
2. The system 100 enhances incident coverage/feed for closures for which traditional data providers, governments, etc. generally do not have complete or comprehensive coverage.
3. The system 100 is based on using probe data which is generally is already available to map service providers because they are collected for other purposes (e.g., map updates, reporting of other types of incidents, etc.).
4. This embodiments described herein are agnostic to road types, allowing a simplified approach to handling roadway closures over many different road types (e.g., highway vs. arterial, ramps, etc.).
5. The system 100 is adaptive/dynamic to each specific roadway segment, allowing the system 100 to respond faster to high density roads which reduces detection time.
6. The system 100 is adaptive/dynamic to traffic fluctuations throughout the day, allowing the system 100 to respond faster to high density time periods which reduces detection time.

Figure 2:
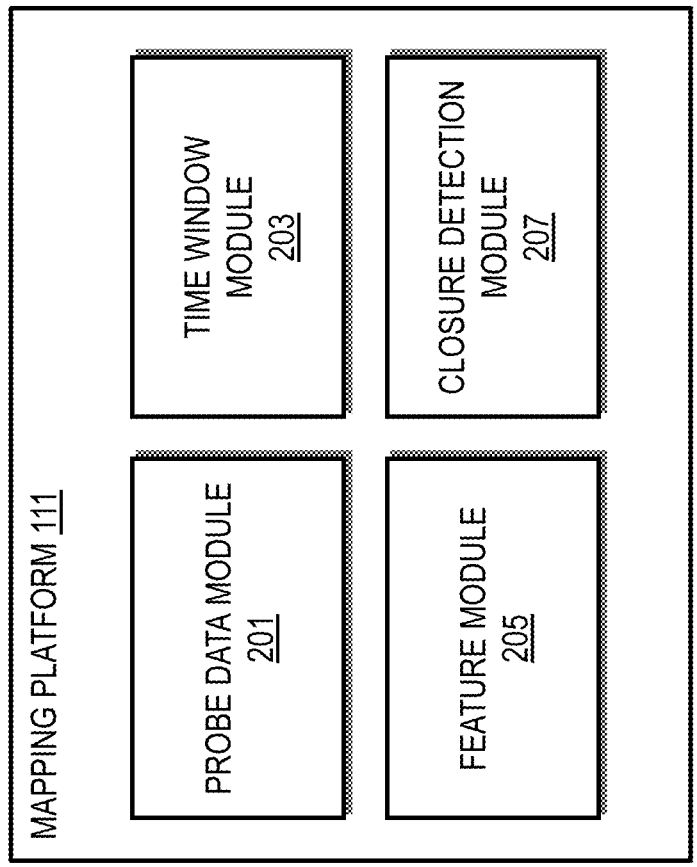
FIG. 2 is a diagram of the components of a mapping platform configured to automatically detect road closures, according to one embodiment.

In one embodiment, as shown in FIG. 2, the system 100 includes a mapping platform 111 that includes one or more components for automatically detecting road closures according to the various embodiments described herein. It is contemplated that the functions of these components may be combined or performed by other components of equivalent functionality. As shown, in one embodiment, the mapping platform 111 includes a probe data module 201, a time window module 203, a feature module 205, and a closure detection module 207. The above presented modules and components of the mapping platform 111 can be implemented in hardware, firmware, software, or a combination thereof. Though depicted as a separate entity in FIG. 1, it is contemplated that the mapping platform 111 may be implemented as a module of any of the components of the system 100 (e.g., a component of the vehicle 113, services platform 103, services 105a-105n (also collectively referred to as services 105), etc.). In another embodiment, one or more of the modules 201-207 may be implemented as a cloud-based service, local service, native application, or combination thereof. The functions of the mapping platform 111 and modules 201-207 are discussed with respect to FIGS. 3-16 below.

Figure 3:
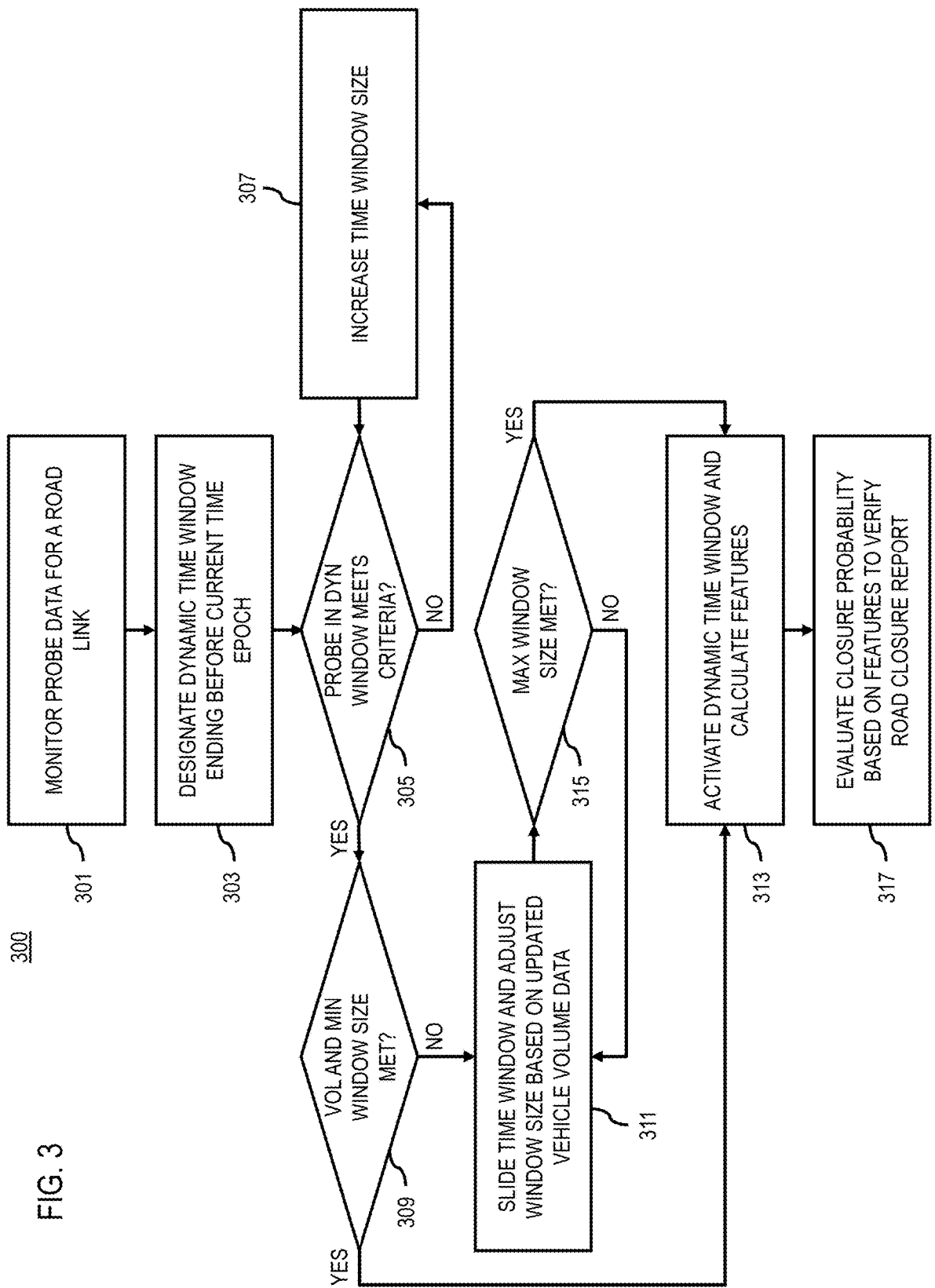
FIG. 3 is a flowchart of a process for automatic road closure detection, according to one embodiment.
Figure 19:
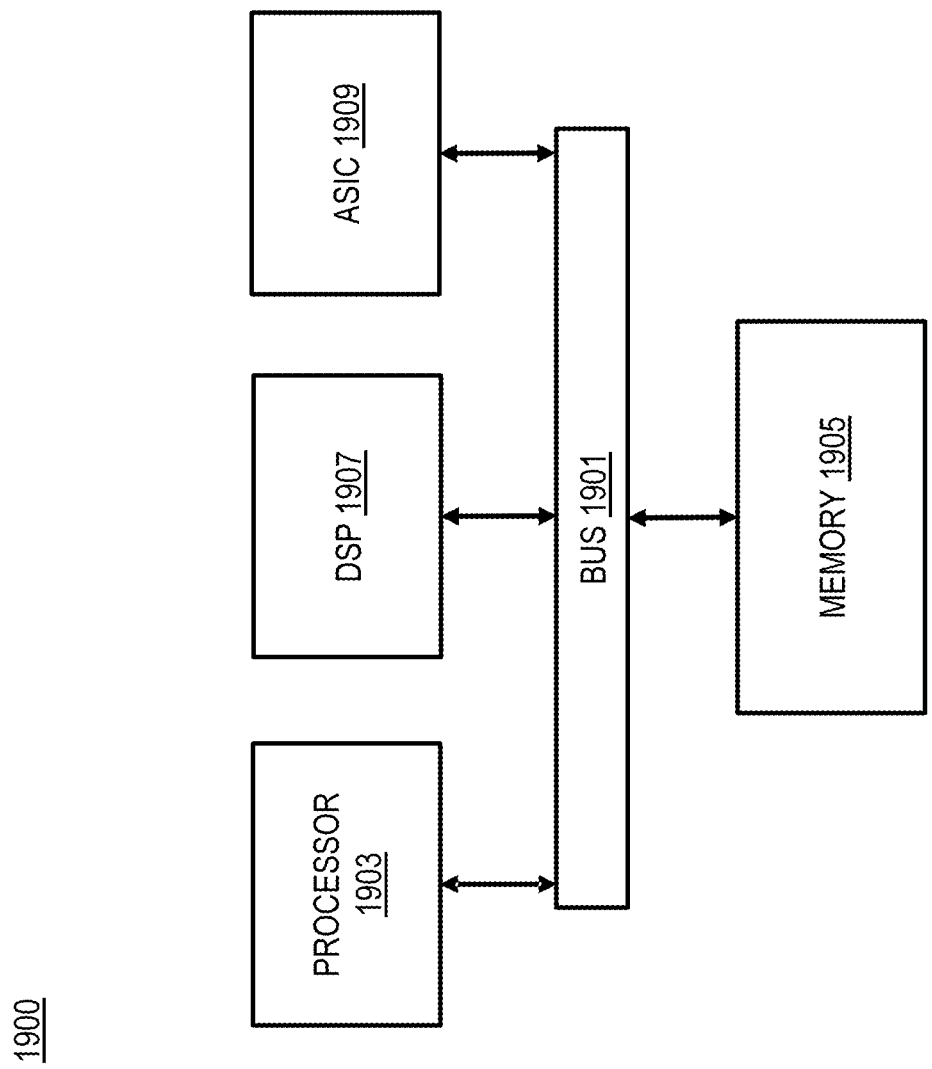
FIG. 19 is a diagram of a chip set that can be used to implement an embodiment.

FIG. 3 is a flowchart of a process for automatic road closure detection, according to one embodiment. In various embodiments, the mapping platform 111 and/or any of the modules 201-207 may perform one or more portions of the process 300 and may be implemented in, for instance, a chip set including a processor and a memory as shown in FIG. 19. As such, the mapping platform 111 and/or any of the modules 201-207 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In one embodiment, the process 300 involves: (1) building a connected closure link graph with a given set of monitored roadways (e.g., road link and/or superlink as described below); (2) calculating a number of features (e.g., lightweight features) derived from probe data collected from the closure link graph to be used for deciding whether a road segment is closed or open; (3) evaluating the closure probability of the road segment using these features to automatically detect a road closure.

In step 301, the probe data module 201 begins by initiating the monitoring of a set of or road links of interest. As previously noted, the road links of interest can be the complete set of global road links (e.g., all road links represented in the geographic database 109) or a portion thereof (e.g., links within a bounded or specified geographic area of interest). In one embodiment, the probe data module 201 can construct a closure link graph comprising a connected set of links representing the road network being monitored. By way of example, a road link is the unit representation of a roadway in a digital map such as the geographic database 109. Additional description of a link data record is described below with respect to FIG. 17. Generally, a roadway between two consecutive intersections can be represented by one or more links. However, a single link does not span more than the distance between two intersections.

Figure 4:
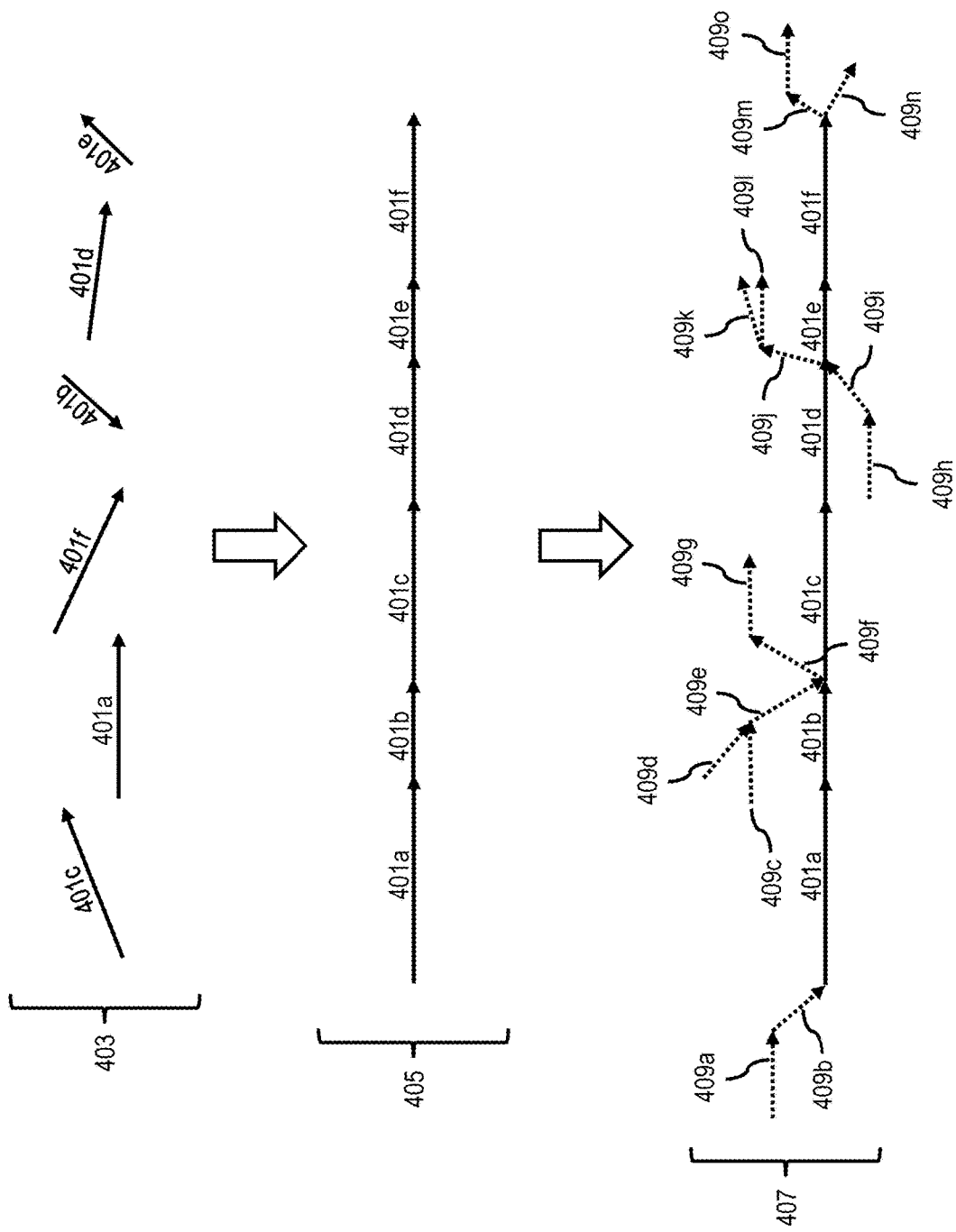
FIG. 4 is a diagram of illustrating an example of constructing a closure link graph, according to one embodiment.

In one embodiment, the closure link graph is used to designate the geographic area of interest for monitor traffic within the area. As shown in FIG. 4, if the links 401 are unordered, the probe data module 201 initiates the building of the closure link graph around these links 401 by ordering the links 401 so that the end of one link is arranged to match the beginning of the next closest link based on the respective locations of their beginning and end nodes. The ordered set 405 of the links 401 is also illustrated in FIG. 4. The ordered set 405 of the links 401 corresponds to the abstract representation of the physical structure road segments making up the roadways that are to be monitored (e.g., the global road network or portion thereof).

Next, the prove data module 201 adds links upstream to and downstream (e.g., links 409a-409o, also collectively referred to as links 409) from the beginning or initial links 401 (e.g., any link within the monitored area) until the selected area of interest in included in the closure link graph 407. In one embodiment, the flow of traffic is determined by collecting probe data. For example, the probe data module 201 retrieves probe data collected from vehicles traveling on the roadways corresponding to the closure link graph 407. In one embodiment, probe data includes raw GPS probes (e.g., probe points) sent from vehicles indicating their respective locations by, for instance, a latitude and longitude pair. Then, each probe point is placed onto most probable link on the map using any map matching process known in art. On example map-matching process works as described in the following section. A map is defined by a set of links and their geographic coordinates. Because GPS (or other similar location positioning technology) is not 100% accurate, the coordinates of a vehicle GPS probe most of the time does not fall onto a link perfectly. To account for this error, map matching algorithms take the coordinate of a GPS probe, and find the neighboring links whose coordinates are close to the probe. Then, the map matching process places the vehicle probe onto the most probable link based on pre-defined criteria based on the specific map matching process or algorithm being used.

In one embodiment, to better control for map matching error, the probe data module 201 described herein work with vehicle paths instead of map matched vehicle probes. The reason is that map matched vehicle probes can be more a susceptible to map matching errors than vehicle paths. By way of example, a vehicle path or trajectory is derived from two consecutive map matched vehicle probes. The path can then be increased by adding new probe points on top of the previously calculated vehicle path as new probe points are collected.

In one embodiment, the probe data module 201 can process the probe data to calculate vehicle paths traversing the monitored closure link graph 407 according to the example process described below. Firstly, for a specific vehicle, the probe data module 201 takes the first and second probe points received, e.g., denoted as probe1 and probe2. If the time difference between these probes is more than a specified threshold, the probe data module 201 discards the initial probe1, and the sets probe1=probe2. The probe data module 201 then retrieves the next probe point to set as probe 2 to iteratively evaluate the time difference.

If the time different difference is less than the specified threshold, the probe data module 201 builds a vehicle path from probe1 to probe2. It is contemplated that the probe data module 201 can use any path building process or algorithm such as but not limited to A* pathfinding or equivalent. The probe data module 201 then records the new path for the vehicle, discards probe1, sets probe1=probe2, and retrieves the next probe point to act as probe2 until all probe points collected for the specific vehicle have been processed.

In one embodiment, every vehicle can send its probe points (e.g., GPS probes) at a different frequency; this frequency can vary from 1 second to a few minutes. Therefore, as a vehicle drives through multiple links, there is no guarantee that it will send a probe from every link. For instance, if a vehicle drives at fast speeds over short links while sending a probe every 2 minutes, it would almost be certain that its two consecutive probes will arrive from non-neighboring links. This sporadic or sparse probe reporting can make it more technically challenging to build accurate vehicle paths.

To address this technical challenge, in one embodiment, as part of its link graph building process, the probe data module 201 methodology can aggregate links and their probes where it makes sense into superlinks. In one embodiment, a superlink consists of ordered links such that if a vehicle travels through one of its links, it is guaranteed to travel through the other links of the same superlink as well. An example of a superlink is a section of a highway stretching between two entrance/exit ramps. When on this stretch a vehicle must go through all the links part when driving this stretch. Another example is a roadway between two intersections in a city road. Because a superlink comprises one or more links, superlinks are often longer than normal links of the geographic database 109, thereby increasing the probability that a probe point of a vehicle path would fall on the superlink than on a normal link. In addition, the superlinks can decrease the overall complexity of the closure link graph 407 without affecting the quality of the closure evaluation results, thereby reducing computing resources (e.g., processing resources, memory resources, bandwidth resources, etc.) associated with automatic evaluation of road closure reports according to the various embodiments described herein.

Figure 5:
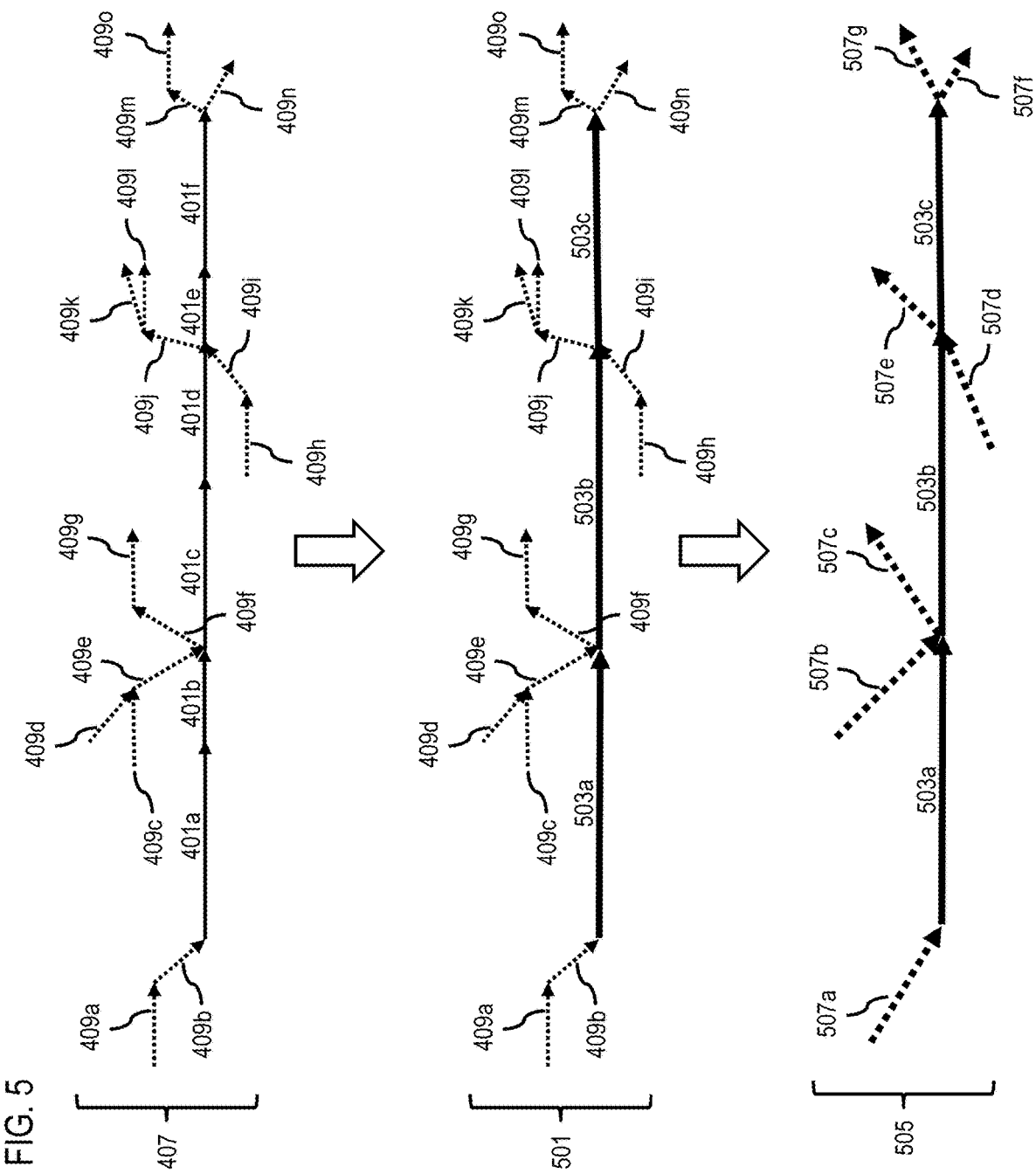
FIG. 5 is diagram of aggregating road links of a closure link graph into superlinks, according to one embodiment.

FIG. 5 is diagram of an example of aggregating road links of the closure link graph 407 into superlinks, according to one embodiment. FIG. 5 continues the example closure link graph 407 of FIG. 5 and illustrates a first superlink graph 501 that is a version of the closure link graph 407 in which the reportedly closed links 401 are aggregated into respective superlinks. In this example, links 401a and 401b can form a superlink 503a because a vehicle on link 401a must also travel through link 401b. Similarly, links 401c and 401d can be aggregated as superlink 503b, and links 401e and 401f can be aggregated into superlink 503c.

In one embodiment, the upstream and downstream links 409 can be aggregated into superlinks in addition to the links 401 to construct superlink graph 505. For example, links 409a and 409b can be aggregated into superlink 507a, links 409c-409e can be aggregated into superlink 507b, links 409f and 409g can be aggregated into superlink 507c, links 409h and 409i can be aggregated into superlink 507d, links 409j-409l can be aggregated into superlink 507e, and links 409m and 409o can be aggregated into superlink 507g. Referring for instance to the example of FIGS. 4 and 5, if a vehicle has probe points on link 401a, 401c, and 401f, the probe data module 201 can calculate the vehicle path to include links all links 401a-401f based on the superlinks 503a-503c.

In one embodiment, the automatic closure detection (ACD) of the process 300 can have very large coverage—practically up to monitoring all roads in the world for 24 hours and 7 days a week. This can create an enormous load on any system. Therefore, in one embodiment, the probe data module 201 can generate a very light-weight but relevant set of features which can indicate an anomaly with monitored roads. In addition, features are calculated for the current time epoch as well as over a period of time in the past; e.g. over the past n time epochs. By way of example, a time epoch can be any designated period of time such as but not limited to not limited to 1 minute, 5 minutes, 1 hour etc. Shorter time epochs, for instance, can result in faster detection at the expensive or computational resource usage.

Returning to step 303 of FIG. 3, in one embodiment, the time window module 203 uses the concept of a "dynamic window" to calculate features in the recent past by a dynamic or static time window comprising one or more time epochs ending before a current time epoch. The time window is measured in time epochs, such that the window (dynamic or static) spans over a number of epochs ending at the exact epoch just before the current epoch. The example below illustrates the relationship between the current epoch and dynamic/static window epochs (e.g., where an epoch is 5 minutes long):

Current epoch spans over: 11:45-11:50;
Dynamic/static window length: 9 epochs; and
Dynamic/static window spans over: 11:00-11:45.

In other words, the time window module 203 designates a dynamic time window comprising one or more time epochs ending before a current time epoch. In one embodiment, the dynamic window is a variable size (e.g., with respect to the number of time epochs), sliding window over n-minute epochs which satisfies the at least one criterion related to the probe data and/or the dynamic time window. The criteria can include any of, but is not limited to, the following:

1. The total expected vehicle volume of all the epochs the dynamic window spans across, is greater than/equal to a threshold volume, called EXPECTED_THRESH.
2. The dynamic window has a minimum size, called MIN_WINDOW_SIZE.
3. The dynamic window has a maximum size, called MAX_WINDOW_SIZE.

When the mapping platform 111 starts monitoring a road link or superlink, in the first epoch the link/superlink has the current-epoch features, and the dynamic window is empty (e.g., because no time epoch immediately before the current epoch has been monitored yet). In one embodiment, the dynamic window starts accumulating epoch data when the time window module 203 monitors epoch 1. In other words, the probe data module 201 retrieves a set of probe data collected from the road link of interest during the dynamic time window to evaluate derived features against the criteria above. For example, the feature module 205 calculates the current-epoch features (epoch 1) and stores data from epoch 0 in the dynamic window.

In step 305, if any of the three dynamic window conditions or criteria above are not satisfied, the time window module 203 waits for the next epoch (epoch 2) to update the dynamic window (with epoch 1's data) (step 307, e.g., by increasing the time window size in the next time epoch and/or sliding the time window to the next penultimate time epoch). In one embodiment, the time window module 203 can adjust the size of the dynamic time window by adding or removing another time epoch ending before the current time epoch until at least one criterion related to the probe data, the dynamic time window, or a combination thereof is met. This process continues until the conditions/criteria (e.g., all three) above are satisfied.

In one embodiment, the time window (e.g., dynamic or static) can be in one of two states: (1) the window is not active yet (if the system is recently turned on), or (2) the window is active. The behaviors for these two states are described below separately. For example, in step 309, until dynamic window criteria 1 (e.g., vehicle threshold volume) and 2 (e.g., minimum time window size) are satisfied, the dynamic window will not slide; rather, the time window will keep growing, adding more epochs to its coverage (return to step 307).

In one embodiment, the mapping platform 111 can also use the criteria discussed above to determine whether a specific road segment or link should be monitored at all. For example, based on MAX_WINDOW_SIZE and EXPECTED_THRESH parameters, the mapping platform 111 can calculate (e.g., in an offline or batch process) to determine if a link/superlink shall be monitored at all or not. In other words, if the total historical volume for a given link/superlink over MAX_WINDOW_SIZE is less than EXPECTED_THRESH, that superlink will never be able to satisfy all three requirements/criteria above, and the dynamic window will never activate. Accordingly, the mapping platform 111 can filter these links/superlinks from the set of monitored links to further advantageously reduce the resource burden associated with automatically detecting road closures. An example of filtering these types of links is shown as follows:

EXPECTED_THRESH=10 vehicles;
MAX_WINDOW_SIZE=288 epochs (i.e., 1 day for 5-minute time epochs);
Total expected volume of superlink S over 1 day=8 vehicles;
Dynamic window for superlink S will never reach EXPECTED_THRESHOLD (10 vehicles), and its dynamic window will never activate.

In step 309, when the dynamic window satisfies both of criteria 1 and 2 above, e.g., at epoch i, the time window is considered active with the time windows spanning across N epochs (from epoch (i−N−1) to epoch i. In the next epoch (epoch (i+1)), the feature module 205 calculates features for the new current-epoch. At the same time, dynamic window adds epoch i as its most recent epoch, spanning over N+1 epochs. Depending on the expected volume of epoch i, the dynamic window might not need one or more of the oldest epochs in its window, while still satisfying criteria 1-2 above. Therefore, after sliding one epoch and adding a new epoch, dynamic window shall clean its oldest epochs while still satisfying the dynamic window requirements. This is shown in step 311 where the time window module 203 initiates a sliding of the dynamic time window along a temporal scale as the current time epoch expires and is replaced by a new current time epoch based on the designating of the dynamic time window as active. The feature module 205 the calculates an updated vehicle volume for the dynamic time window after the sliding. This then enables the time window module 203 to adjust the time window by increasing or decreasing the size of the dynamic time window based on a comparison of the updated vehicle to the vehicle volume threshold.

Embodiments of the dynamic sliding time window are described in more detail with respect to the example of FIGS. 6-16 below. For example, FIG. 6 illustrates two time series: a time series 601 for actual vehicle volume, and another time series 603 for expected vehicle volume derived from historical data. The time series 601 and 603 cover epoch-0 ($e_0$) to epoch-9 ($e_9$). The examples of FIG. 7-16 below start at $e_0$ and show the evolution of the dynamic window as time passes and new data arrives. In these examples, while the reader can see the future data (e.g., data occurring in the time epochs following the current time epoch 701 denoted by a rectangle in FIG. 7, the mapping platform 111 only sees the current-epoch's data (e.g., data in $e_0$).

More specifically, FIG. 7 illustrates the dynamic time window at $e_0$. The current epoch $e_0$ is the first epoch seen by the mapping platform 111 so far. As there is not a previous epoch known to the mapping platform 111, dynamic window construction has not started yet, and no features are calculated.

As shown in FIG. 8, when the current epoch 701 moves to $e_1$ (e.g., as time passes), $e_0$ is stored in the dynamic window. The mapping platform 111 then processes the probe data for the dynamic time window 801 (e.g., including $e_0$) to check whether the total expected (historic) vehicle volume (or equivalent feature/attribute) in the window is greater than EXPECTED_THRESH, which is 10 in this example. As shown, the sum of the historic volume in the dynamic window 801 is 3 and less than threshold value of 10. Therefore, the time window 801 is not activated yet. In this example, the inactive window 801 is denoted by a dashed rectangle. Since the window 801 is inactive, no features are calculated yet.

As shown in FIG. 9, when the current epoch 701 epoch moves to $e_2$, the dynamic window 801 now includes e0 and e1, with a total expected vehicle count of 6. This sum is still less than EXPECTED_THRESH, and therefore the time window 801 is not activated, and no features are calculated. Similarly, as shown in FIG. 10, as the current epoch 701 moves to $e_3$, the dynamic window 801 now includes $e_0$, $e_1$ and $e_2$, with a total expected vehicle count of 8. This sum is still less than EXPECTED_THRESH, the time window 801 is not activated, and no features are calculated.

As shown in FIG. 11, when the current epoch 701 moves to $e_4$, the dynamic window 801 now includes $e_0$, $e_1$, $e_2$ and $e_3$, with a total expected vehicle count of 10.5. Finally, the total number of vehicles expected to be seen in the dynamic window 801 is greater than EXPECTED_THRESH. Therefore, the time window 801 is activated, which is denoted by solid yellow rectangle.

In step 315, on activation, the feature module 205 can initiate the feature calculation process. In one embodiment, before calculating the features, the time window module 203 checks if older epochs can be removed from the window 801 while maintaining total expected vehicles greater than EXPECTED_THRESH. The first removal candidate is the oldest epoch of the window 801 (e.g., $e_0$). In this example, removing $e_0$ will take reduce the sum below the threshold value of 10 (e.g., 10.5–3=7.5). Therefore, no epochs are removed from the dynamic window 801.

In one embodiment, features generated using probe data in the dynamic window 801 are defined as "dynamic features". Before generating the dynamic features, the dynamic window 801 has to be filled with enough data, as described above. Only after the dynamic window 801 is full, will the dynamic features be calculated to make a prediction on the condition or closure status of the monitored link/superlink. In one embodiment, the mapping platform 111 can activate on meeting the two criteria above or all three criteria (e.g., threshold value, minimum window size, and maximum window size) before activating the time window 801 for feature calculation (e.g., step 315). Once the dynamic window 801 is activated (e.g., all three or other number of designated conditions are satisfied), the feature module 201 calculates a set of features and makes a prediction. In one embodiment, the features are selected for because they use light-weight calculations to compute values, and therefore reduce computing resource requirements. By way of example, the features include but are not limited to:

Current Epoch Volume—Unique vehicles seen on the link/superlink in the current epoch 701;

Expected Current Volume—Historical volume for a given link/superlink for the current epoch 701;

Current Volume Ratio—Ratio of current volume to expected volume defined as: current volume/expected volume;

Dynamic Volume—Total number of unique vehicles seen on link/superlink over all the epochs which the dynamic window 801 spans across;

Expected Dynamic Volume—Total historical volume of the superlink over all the epochs which the dynamic window spans across;

Dynamic Ratio—Ratio of dynamic volume to expected dynamic volume defined as: dynamic volume/expected dynamic volume; and Dynamic Window Size—Size of the dynamic window (e.g., epochs, time, etc.).

Based on the example of FIG. 11 above, the time window 801 is activated, and the feature module 205 calculates the following feature values:

Current Volume=1;
Current Expected Volume=5;
Current Ratio=1/5;
Dynamic Volume=0+1+1+2=4;
Dynamic Expected Volume=3+3+2+2.5=10.5;
Dynamic Ratio=4/10.5; and
Window Size=4.

As shown in FIG. 12, when the current epoch 701 moves to is e5, the dynamic window 801 adds $e_4$, spanning over $e_0$-$e_4$. Since the dynamic window 801 has been activated once, it will never become inactive again. The time window module 203 then checks if any older epochs can be removed from it while maintaining its sum above EXPECTED_THRESH. It turns out, $e_0$ is not needed anymore. After removing $e_0$, the time window 801 still has a total of 12.5 expected vehicles. The feature module 205 then calculates the following feature values from the activated window 801:

Current Volume=3;
Current Expected Volume=4;
Current Ratio=3/4;
Dynamic Volume=5;
Dynamic Expected Volume=12.5;
Dynamic Ratio=5/12.5; and
Window Size=4.

As shown in FIG. 13, when the current epoch 701 moves to $e_6$, the dynamic window 801 adds $e_5$ spanning over $e_1$-$e_5$. The time windows module 203 then removes $e_1$ and $e_2$ because the sum for $e_3$-$e_5$ is still above the threshold. The feature module 205 then calculates the following feature values from the activated window 801:

Current Volume=2;
Current Expected Volume=2;
Current Ratio=2/2;
Dynamic Volume=6;
Dynamic Expected Volume=11.5;
Dynamic Ratio=6/11.5; and
Window Size=3.

As shown in FIG. 14, when the current epoch 701 moves to $e_7$, the dynamic window 801 adds $e_6$ spanning over $e_3$-$e_6$. The time window module 203 then removes $e_3$ because its volume value is not needed to keep the sum above the threshold value. The feature module 205 then calculates the following feature values from the activated window 801:

Current Volume=1;
Current Expected Volume=1;
Current Ratio=1/1;
Dynamic Volume=6;
Dynamic Expected Volume=11;
Dynamic Ratio=6/11; and
Window Size=3.

As shown in FIG. 15, when the current epoch 701 moves to $e_8$, the dynamic window adds $e_7$. However, because the sum with the window 801 being 3 epochs wide fell below the threshold, the time window module 203 increase the size of the window 801 back to 4 epochs wide. The feature module 205 then calculates the following feature values from the activated window 801:

Current Volume=1;
Current Expected Volume=0;
Current Ratio=1/0;
Dynamic Volume=7;
Dynamic Expected Volume=12;
Dynamic Ratio=7/12; and
Window Size=4.

As shown in FIG. 16, when the current epoch 701 moves to $e_9$, the dynamic window 801 adds $e_8$. Because the sum at 4 epochs wide does not meet the threshold, the time window 801 again increases the dynamic window to 5 epochs wide. The feature module 205 then calculates the following feature values from the activated window 801:

Current Volume=0;
Current Expected Volume=0;
Current Ratio=0/0;
Dynamic Volume=8;
Dynamic Expected Volume=12;
Dynamic Ratio=8/12; and
Window Size=5.

As illustrated in the examples of FIGS. 6-16, the mapping platform 111 is able to dynamically adjust the time window for calculating features so that the resulting derived features can be based on enough data to make a more accurate or reliable closure classification while also minimizing the amount of data that is to be processed for each road segment over time.

It is contemplated that the features calculated above are provided by way of illustration and not as limitations. Accordingly, any feature that is correlated to road closure detection (e.g., has a statistical correlation above a threshold value) can be used in the embodiments described herein. For example, in one embodiment, the feature module 205 can also calculate a feature representing the expected number of through vehicles for a link/superlink. The expected through vehicle feature, for instance, is the total number of vehicles expected to pass through a link or superlink for a given epoch (e.g. 5 minutes) so that the evaluation of the through vehicles feature to the expected through vehicles feature can be performed for each given time epoch. In one embodiment, the expected through vehicles feature is the summary statistics of the number of through vehicles for that specific time epoch over a historical period (e.g., the same time epoch over a number of days). There are different possibilities to calculate this value, such as but not limited to the following (note that as an example, it is assumed an epoch corresponds to 5-minutes, and there are 100 days-worth of historical data):

1. Over all epochs in a day, over all days, calculate average through vehicle value. There are 288 5-minute epochs per day. This embodiment of the feature averages all 288×100 through vehicle feature values.
2. Over all days, calculate an average through vehicle value for every specific 5-minute epoch in a day. Hence, there will be one value for the interval 00:00-00:05, another one for 00:05-00:10, . . . 23:55-00:00.
3. Calculate the same average as in item 2 above. In one embodiment, this can calculation can be stratified by time to capture differences in values between types of days (e.g., weekends versus weekdays). In this case, the expected through vehicles feature can be calculated twice; once for weekends, once for weekdays.
4. Calculate the same average as in item 2 above for each weekday, Monday through Sunday, to capture difference in values between individual days. Time stratifications other than days can also be used including but not limited to months, seasons, day versus night, etc.
5. Any approach from among items 1 to 4 above; but replace average with median or other equivalent statistic.

In one embodiment, the dynamic window approach described in the embodiments above is a generalization of a simpler mechanism, i.e., a static window. The static window approach is where the window size is fixed and does not vary with data. An example would be a window with a fixed-size of 5 epochs, which would span the epochs illustrated in Table 1 as the current time or epoch changes.

TABLE 1

| Current Epoch | Static Window Start | Static Window End |
|---|---|---|
| e5 | e0 | e4 |
| e6 | e1 | e5 |
| e7 | e2 | e6 |
| . . . | . . . | . . . |
| eN | e(N − 5) | e(N − 1) |

In an embodiment using a static window approach, there would be no change to current-epoch features calculated with respect the dynamic windows approach. In other words, the static window features would be calculated the same way as in dynamic window case:

Current Volume;
Current Expected Volume;
Current Ratio;
Static Volume;
Static Expected Volume;
Dynamic Ratio; and
Window Size.

In step 317, after calculating the features derived from probe data of closure link graph being monitored or evaluated, the closure detection module 207 can evaluate the closure probability of the monitored road link indicated based on the calculated features for the corresponding time windows (e.g., dynamic and/or static windows). The closure probability, in turn, can then be used to automatically detect a road closure, traffic incident, or other anomaly. In other words, once the features are generated according to the various embodiments described above, each link/superlink is evaluated individually to determine whether it is closed, open, partially opened, or otherwise affected by a traffic incident. In one embodiment, this evaluation can follow a rule-based algorithm, a machine-learning based algorithm, or any equivalent process.

For example, a rule-based algorithm can combine one or more of the features as a set of logical sentences with evaluation criteria (e.g., feature1>3 and feature2<2| feature 3==1.5 and feature 4 is false). A machine-learning based algorithm, for instance, can use labeled training data, which for each link/superlink-epoch pair closure state is known or labeled (e.g., state is closed or open). The algorithm then selects a learner (e.g., neural network, support vector machine etc.), and adjusts weights of the features to minimize the loss function given the labels. In the final step, the machine-learning process produces a closure probability for a given superlink based on the trained model. If this probability is beyond a certain threshold, the machine learning classifier can classify the link/superlink as closed; otherwise, the link/superlink can be classified as open. For example, this decision or classification threshold could be 0.5, where a probability above 0.5 would indicate closure and a value below 0.5 would indicate the superlink is open.

In one embodiment, the closure detection module 207 can perform decision hysteresis avoidance. When the features have ambiguous values, the closure detection module 207 might produce a closure probability close to the decision threshold. Accordingly, with slight changes to any of the feature values, the closure probability could go beyond the threshold, come back and exceed the threshold again multiple times in a short time interval. This would result in multiple back-and-forths between different closures states (e.g., open and closed states). In one embodiment, to avoid such fluctuations around the decision threshold by using multiple asymmetric decision thresholds.

The following pseudo code describes, for instance, how this problem is solved using two more thresholds on top of decision threshold. In this example, these thresholds are Closure Threshold and Opening Threshold.

1. For the first time, when the closure detection module 207 is going to make a closure verification decision, it calculates a closure probability and decides on a closure status by comparing this closure probability to decision threshold. If probability>=decision threshold, close the road. Else open it.
2. In subsequent decisions, again the closure probability is calculated. However, this time it is compared against one of the new thresholds depending on the most recent closure state. By doing this, the decision threshold is ignored. Specifically,
   a. If the most recent closure state=closed, compare closure probability to Opening Threshold. If closure probability<Opening Threshold, open the road. Else, keep the state as closed. In one embodiment, the Opening Threshold differs from the original decision threshold by a predetermined value. This predetermined value can be based on the desired sensitivity to noise or fluctuations (e.g., greater differences between the Opening Threshold and the original decision threshold reduce fluctuations between closure states, while smaller differences between the Opening Threshold and the original decision threshold are more susceptible to fluctuations between closure states).
   b. If the most recent closure state=open, compare closure probability to Closure Threshold. If closure probability>Closure Threshold, close the road. Else keep the state as open. The Closure Threshold can be set analogously as described with respect to the Opening Threshold described above.
   Examples of the thresholds are as follows:
   Decision Threshold=0.5
   Opening Threshold=0.25
   Closure Threshold=0.75

The following example illustrates hysteresis avoidance using the example thresholds listed above:
   @ time=t1: Initial closure probability=0.52: Road status is set to closed.
   @ time=t2: Closure probability=0.35: Road status remains closed as closure probability is greater than Opening Threshold.
   @ time=t3: Closure probability=0.22: Road status set to open as closure probability is less than Opening Threshold.
   @ time=t4: Closure Probability=0.67: Road status remains open as closure probability is less than Closure Threshold.
   @ time=t5: Closure Probability=0.80: Road status set to closed as closure probability is greater than Closure Threshold.

Returning to FIG. 1, in one embodiment, the mapping platform 111 has connectivity over a communication network 117 to other components of the system 100 including but not limited to road closure reports 101, services platform 103, services 105, content providers 107, geographic database 109, and/or vehicles 113 (e.g., probes). By way of example, the services 105 may also be other third-party services and include probe data, traffic incident services (e.g., to report road closures), mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 103 uses the output (e.g. physical divider predictions) of the mapping platform 111 to provide services such as navigation, mapping, other location-based services, etc.

In one embodiment, the mapping platform 111 may be a platform with multiple interconnected components. The mapping platform 111 may include multiple servers, intelligent networking devices, computing devices, components and corresponding software for providing parametric representations of lane lines. In addition, it is noted that the mapping platform 111 may be a separate entity of the system 100, a part of the one or more services 105, a part of the services platform 103, or included within the vehicle 113.

In one embodiment, content providers 107*a*-107*m* (collectively referred to as content providers 107) may provide content or data (e.g., including geographic data, parametric representations of mapped features, etc.) to the geographic database 109, the mapping platform 111, the services platform 103, the services 105, and the vehicle 113. The content provided may be any type of content, such as traffic incident content (e.g., road closure reports), map content, textual content, audio content, video content, image content, etc. In one embodiment, the content providers 107 may provide content that may aid in the detecting and classifying of road closures or other traffic incidents. In one embodiment, the content providers 107 may also store content associated with the geographic database 109, mapping platform 111, services platform 103, services 105, and/or vehicle 113. In another embodiment, the content providers 107 may manage access to a central repository of data, and offer a consistent, standard interface to data, such as a repository of the geographic database 109.

In one embodiment, the vehicles 113, for instance, are part of a probe-based system for collecting probe data for detecting traffic incidents and/or measuring traffic conditions in a road network. In one embodiment, each vehicle 113 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 113 may include sensors 115 for reporting measuring and/or reporting attributes. The attributes can also be any attribute normally collected by an on-board diagnostic (OBD) system of the vehicle, and available through an interface to the OBD system (e.g., OBD II interface or other similar interface). In one embodiment, this data allows the system 100 to calculate or construct vehicle paths of a vehicle 113 over a stretch of road (e.g., over a closure link graph).

The probe points can be reported from the vehicles 113 in real-time, in batches, continuously, or at any other frequency requested by the system 100 over, for instance, the communication network 117 for processing by the mapping platform 111. The probe points also can be mapped to specific road links stored in the geographic database 109. In one embodiment, the system 100 (e.g., via the mapping platform 111) can generate probe traces (e.g., vehicle paths or trajectories) from the probe points for an individual probe so that the probe traces represent a travel trajectory or vehicle path of the probe through the road network.

In one embodiment, the vehicle 113 is configured with various sensors 115 for generating or collecting vehicular sensor data, related geographic/map data, etc. In one embodiment, the sensed data represent sensor data associated with a geographic location or coordinates at which the sensor data was collected. In this way, the sensor data can act as observation data that can be separated into location-aware training and evaluation datasets according to their data collection locations as well as used for evaluating road closure reports according to the embodiments described herein. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 113 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 113 may detect the relative distance of the vehicle from a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 113 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 117 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 111, services platform 103, services 105, vehicle 113, and/or content providers 107 communicate with each other and other components of the system 100 using well known, new or still developing protocols. In this context, a protocol includes a set of rules defining how the network nodes within the communication network 117 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 17:
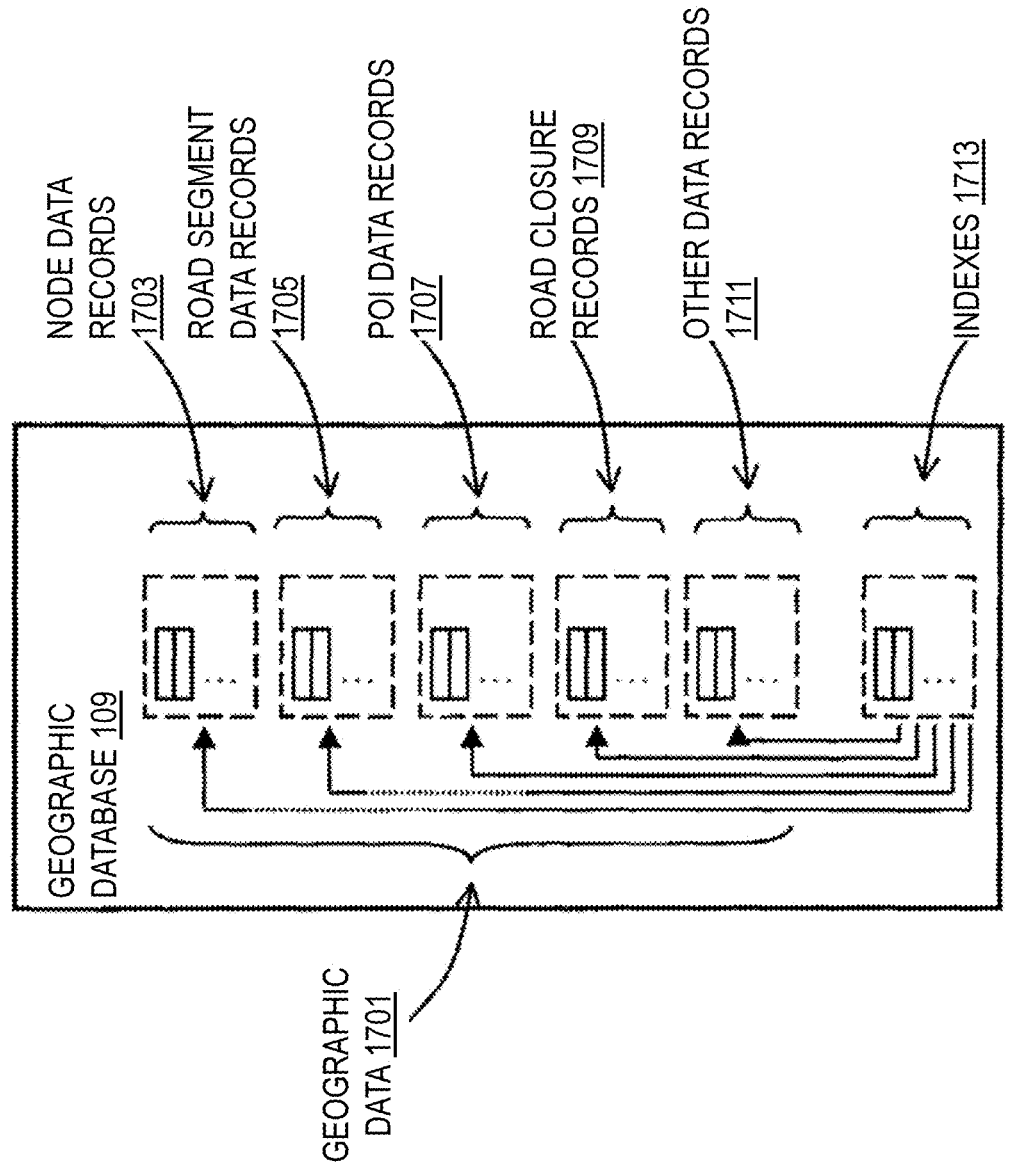
FIG. 17 is a diagram of a geographic database, according to one embodiment.

FIG. 17 is a diagram of a geographic database, according to one embodiment. In one embodiment, the geographic database 109 includes geographic data 1701 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 1703, road segment or link data records 1705, POI data records 1707, road closure data records 1709, other records 1711, and indexes 1713, for example. More, fewer or different data records can be provided. In one embodiment, additional data records (not shown) can include cartographic ("carto") data records, routing data, and maneuver data. In one embodiment, the indexes 1713 may improve the speed of data retrieval operations in the geographic database 109. In one embodiment, the indexes 1713 may be used to quickly locate data without having to search every row in the geographic database 109 every time it is accessed. For example, in one embodiment, the indexes 1713 can be a spatial index of the polygon points associated with stored feature polygons.

In exemplary embodiments, the road segment data records 1705 are links or segments representing roads, streets, or paths, as can be used in the calculated route or recorded route information for determination of one or more personalized routes. The node data records 1703 are end points corresponding to the respective links or segments of the road segment data records 1705. The road link data records 1705 and the node data records 1703 represent a road network, such as used by vehicles, cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 1707. The geographic database 109 can also include data about places, such as cities, towns, or other communities, and other geographic features, such as bodies of water, mountain ranges, etc. Such place or feature data can be part of the POI data records 1707 or can be associated with POIs or POI data records 1707 (such as a data point used for displaying or representing a position of a city).

In one embodiment, the geographic database 109 includes the road closure data records 1709 for current and historical probe data, time window data, road closure detections, road closure reports, road closure evaluations, road closure link graphs, associated vehicle paths, extracted features derived from the probe data, and/or any other related data. The road closure data records 1709 include a road closure data layer 119 that store the automatic road closure detections generated according to the various embodiments described herein. The road closure data layer 119 can be provided to other system components or end users to provided related mapping, navigation, and/or other location-based services. In one embodiment, the road closure data records 1709 can be associated with segments of a road link (as opposed to an entire link). It is noted that the segmentation of the road for the purposes of road closure detections can be different than the road link structure of the geographic database 109. In other words, the segments can further subdivide the links of the geographic database 109 into smaller segments (e.g., of uniform lengths such as 5-meters). In this way, road closures or other traffic incidents can be predicted and represented at a level of granularity that is independent of the granularity or at which the actual road or road network is represented in the geographic database 109. In one embodiment, the road closure data records 1709 can be associated with one or more of the node records 1703, road segment or link records 1705, and/or POI data records 1707; or portions thereof (e.g., smaller or different segments than indicated in the road segment records 1705) to provide situational awareness to drivers and provide for safer autonomous operation of vehicles.

In one embodiment, the geographic database 109 can be maintained by the content provider 107 in association with the services platform 103 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., road closures or other traffic incidents, etc.) and/or record information about them, for example. Also, remote sensing, such as aerial or satellite photography, can be used.

In one embodiment, the geographic database 109 include high resolution or high definition (HD) mapping data that provide centimeter-level or better accuracy of map features. For example, the geographic database 109 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 109 is stored as a hierarchical or multilevel tile-based projection or structure. More specifically, in one embodiment, the geographic database 109 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 113, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing automatic road closure detection may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 18:
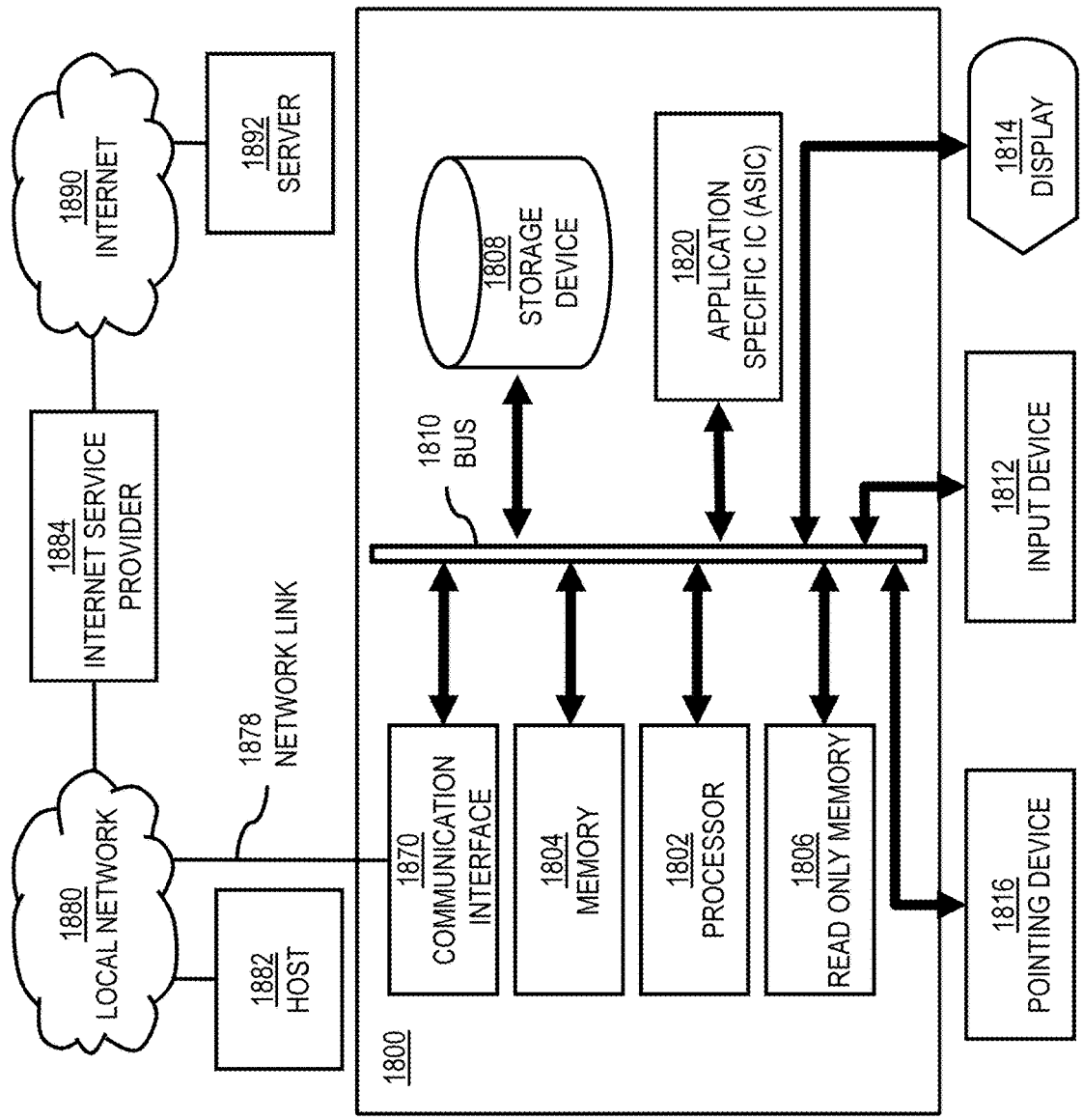
FIG. 18 is a diagram of hardware that can be used to implement an embodiment.

FIG. 18 illustrates a computer system 1800 upon which an embodiment of the invention may be implemented. Computer system 1800 is programmed (e.g., via computer program code or instructions) to provide automatic road closure detection as described herein and includes a communication mechanism such as a bus 1810 for passing information between other internal and external components of the computer system 1800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1810 includes one or more parallel conductors of information so that information is transferred quickly among devices coupled to the bus 1810. One or more processors 1802 for processing information are coupled with the bus 1810.

A processor 1802 performs a set of operations on information as specified by computer program code related to providing automatic road closure detection. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1810 and placing information on the bus 1810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1800 also includes a memory 1804 coupled to bus 1810. The memory 1804, such as a random access memory (RANI) or other dynamic storage device, stores information including processor instructions for providing automatic road closure detection. Dynamic memory allows information stored therein to be changed by the computer system 1800. RAM allows a unit of information stored at a location called a memory address to be stored and retrieved independently of information at neighboring addresses. The memory 1804 is also used by the processor 1802 to store temporary values during execution of processor instructions. The computer system 1800 also includes a read only memory (ROM) 1806 or other static storage device coupled to the bus 1810 for storing static information, including instructions, that is not changed by the computer system 1800. Some memory is composed of volatile storage that loses the information stored thereon when power is lost. Also coupled to bus 1810 is a non-volatile (persistent) storage device 1808, such as a magnetic disk, optical disk or flash card, for storing information, including instructions, that persists even when the computer system 1800 is turned off or otherwise loses power.

Information, including instructions for providing automatic road closure detection, is provided to the bus 1810 for use by the processor from an external input device 1812, such as a keyboard containing alphanumeric keys operated by a human user, or a sensor. A sensor detects conditions in its vicinity and transforms those detections into physical expression compatible with the measurable phenomenon used to represent information in computer system 1800. Other external devices coupled to bus 1810, used primarily for interacting with humans, include a display device 1814, such as a cathode ray tube (CRT) or a liquid crystal display (LCD), or plasma screen or printer for presenting text or images, and a pointing device 1816, such as a mouse or a trackball or cursor direction keys, or motion sensor, for controlling a position of a small cursor image presented on the display 1814 and issuing commands associated with graphical elements presented on the display 1814. In some embodiments, for example, in embodiments in which the computer system 1800 performs all functions automatically without human input, one or more of external input device 1812, display device 1814 and pointing device 1816 is omitted.

In the illustrated embodiment, special purpose hardware, such as an application specific integrated circuit (ASIC) 1820, is coupled to bus 1810. The special purpose hardware is configured to perform operations not performed by processor 1802 quickly enough for special purposes. Examples of application specific ICs include graphics accelerator cards for generating images for display 1814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1800 also includes one or more instances of a communications interface 1870 coupled to bus 1810. Communication interface 1870 provides a one-way or two-way communication coupling to a variety of external devices that operate with their own processors, such as printers, scanners and external disks. In general the coupling is with a network link 1878 that is connected to a local network 1880 to which a variety of external devices with their own processors are connected. For example, communication interface 1870 may be a parallel port or a serial port or a universal serial bus (USB) port on a personal computer. In some embodiments, communications interface 1870 is an integrated services digital network (ISDN) card or a digital subscriber line (DSL) card or a telephone modem that provides an information communication connection to a corresponding type of telephone line. In some embodiments, a communication interface 1870 is a cable modem that converts signals on bus 1810 into signals for a communication connection over a coaxial cable or into optical signals for a communication connection over a fiber optic cable. As another example, communications interface 1870 may be a local area network (LAN) card to provide a data communication connection to a compatible LAN, such as Ethernet. Wireless links may also be implemented. For wireless links, the communications interface 1870 sends or receives or both sends and receives electrical, acoustic or electromagnetic signals, including infrared and optical signals, that carry information streams, such as digital data. For example, in wireless handheld devices, such as mobile telephones like cell phones, the communications interface 1870 includes a radio band electromagnetic transmitter and receiver called a radio transceiver. In certain embodiments, the communications interface 1870 enables connection to the communication network 117 for providing automatic road closure detection.

The term computer-readable medium is used herein to refer to any medium that participates in providing information to processor 1802, including instructions for execution. Such a medium may take many forms, including, but not limited to, non-volatile media, volatile media and transmission media. Non-volatile media include, for example, optical or magnetic disks, such as storage device 1808. Volatile media include, for example, dynamic memory 1804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 19 illustrates a chip set 1900 upon which an embodiment of the invention may be implemented. Chip set 1900 is programmed to provide automatic road closure detection as described herein and includes, for instance, the processor and memory components described with respect to FIG. 18 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1900 includes a communication mechanism such as a bus 1901 for passing information among the components of the chip set 1900. A processor 1903 has connectivity to the bus 1901 to execute instructions and process information stored in, for example, a memory 1905. The processor 1903 may include one or more processing cores with each core configured to perform independently. A multi-core processor enables multiprocessing within a single physical package. Examples of a multi-core processor include two, four, eight, or greater numbers of processing cores. Alternatively or in addition, the processor 1903 may include one or more microprocessors configured in tandem via the bus 1901 to enable independent execution of instructions, pipelining, and multithreading. The processor 1903 may also be accompanied with one or more specialized components to perform certain processing functions and tasks such as one or more digital signal processors (DSP) 1907, or one or more application-specific integrated circuits (ASIC) 1909. A DSP 1907 typically is configured to process real-world signals (e.g., sound) in real time independently of the processor 1903. Similarly, an ASIC 1909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1903 and accompanying components have connectivity to the memory 1905 via the bus 1901. The memory 1905 includes both dynamic memory (e.g., RAM, magnetic disk, writable optical disk, etc.) and static memory (e.g., ROM, CD-ROM, etc.) for storing executable instructions that when executed perform the inventive steps described herein to provide automatic road closure detection. The memory 1905 also stores the data associated with or generated by the execution of the inventive steps.

Figure 20:
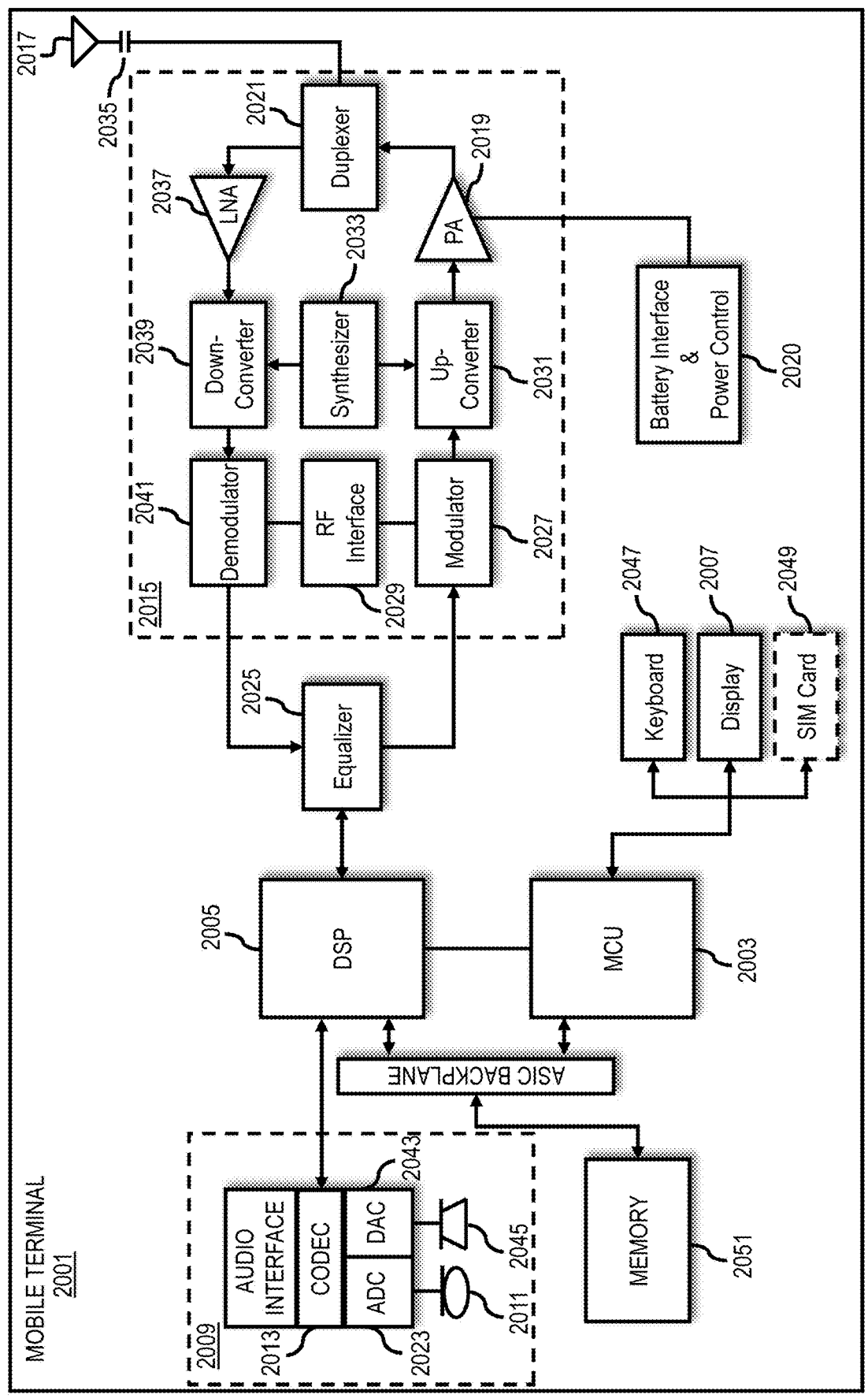
FIG. 20 is a diagram of a mobile terminal (e.g., handset or vehicle or part thereof) that can be used to implement an embodiment.

FIG. 20 is a diagram of exemplary components of a mobile terminal (e.g., embedded device or system of the vehicle 113 for accessing or performing the functions of the mapping platform 111 alone or in combination with the mapping platform 111) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 2003, a Digital Signal Processor (DSP) 2005, and a receiver/transmitter unit including a microphone gain control unit and a speaker gain control unit. A main display unit 2007 provides a display to the user in support of various applications and mobile station functions that offer automatic contact matching. An audio function circuitry 2009 includes a microphone 2011 and microphone amplifier that amplifies the speech signal output from the microphone 2011. The amplified speech signal output from the microphone 2011 is fed to a coder/decoder (CODEC) 2013.

A radio section 2015 amplifies power and converts frequency in order to communicate with a base station, which is included in a mobile communication system, via antenna 2017. The power amplifier (PA) 2019 and the transmitter/modulation circuitry are operationally responsive to the MCU 2003, with an output from the PA 2019 coupled to the duplexer 2021 or circulator or antenna switch, as known in the art. The PA 2019 also couples to a battery interface and power control unit 2020.

In use, a user of mobile station 2001 speaks into the microphone 2011 and his or her voice along with any detected background noise is converted into an analog voltage. The analog voltage is then converted into a digital signal through the Analog to Digital Converter (ADC) 2023. The control unit 2003 routes the digital signal into the DSP 2005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 2025 for compensation of any frequency-dependent impairments that occur during transmission though the air such as phase and amplitude distortion. After equalizing the bit stream, the modulator 2027 combines the signal with a RF signal generated in the RF interface 2029. The modulator 2027 generates a sine wave by way of frequency or phase modulation. In order to prepare the signal for transmission, an up-converter 2031 combines the sine wave output from the modulator 2027 with another sine wave generated by a synthesizer 2033 to achieve the desired frequency of transmission. The signal is then sent through a PA 2019 to increase the signal to an appropriate power level. In practical systems, the PA 2019 acts as a variable gain amplifier whose gain is controlled by the DSP 2005 from information received from a network base station. The signal is then filtered within the duplexer 2021 and optionally sent to an antenna coupler 2035 to match impedances to provide maximum power transfer. Finally, the signal is transmitted via antenna 2017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 2001 are received via antenna 2017 and immediately amplified by a low noise amplifier (LNA) 2037. A down-converter 2039 lowers the carrier frequency while the demodulator 2041 strips away the RF leaving only a digital bit stream. The signal then goes through the equalizer 2025 and is processed by the DSP 2005. A Digital to Analog Converter (DAC) 2043 converts the signal and the resulting output is transmitted to the user through the speaker 2045, all under control of a Main Control Unit (MCU) 2003—which can be implemented as a Central Processing Unit (CPU) (not shown).

The MCU 2003 receives various signals including input signals from the keyboard 2047. The keyboard 2047 and/or the MCU 2003 in combination with other user input components (e.g., the microphone 2011) comprise a user interface circuitry for managing user input. The MCU 2003 runs a user interface software to facilitate user control of at least some functions of the mobile station 2001 to provide automatic road closure detection. The MCU 2003 also delivers a display command and a switch command to the display 2007 and to the speech output switching controller, respectively. Further, the MCU 2003 exchanges information with the DSP 2005 and can access an optionally incorporated SIM card 2049 and a memory 2051. In addition, the MCU 2003 executes various control functions required of the station. The DSP 2005 may, depending upon the implementation, perform any of a variety of conventional digital processing functions on the voice signals. Additionally, DSP 2005 determines the background noise level of the local environment from the signals detected by microphone 2011 and sets the gain of microphone 2011 to a level selected to compensate for the natural tendency of the user of the mobile station 2001.

The CODEC 2013 includes the ADC 2023 and DAC 2043. The memory 2051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 2051 may be, but not limited to, a single memory, CD, DVD, ROM, RAM, EEPROM, optical storage, or any other non-volatile or non-transitory storage medium capable of storing digital data.

An optionally incorporated SIM card 2049 carries, for instance, important information, such as the cellular phone number, the carrier supplying service, subscription details, and security information. The SIM card 2049 serves primarily to identify the mobile station 2001 on a radio network.

The card 2049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for automatic road closure detection comprising:
   retrieving a first set of probe data collected from a road link during one or more time epochs;
   retrieving a second set of probe data collected from the road link during another time epoch;
   extracting a plurality of features from the first set of probe data, the second set of probe data, or a combination thereof; and
   detecting a closure status of the road link based on the extracted plurality of features.

2. The method of claim 1, wherein the closure status is detected by applying a rule-based algorithm to the extracted plurality of features.

3. The method of claim 2, wherein the rule-based algorithm combines the extracted plurality of features into one or more logical sentences and one or more associated evaluation criteria.

4. The method of claim 1, wherein the closure status is detected by applying a machine-learning based algorithm.

5. The method of claim 4, wherein the machine-learning based algorithm determines a closure probability based on the extracted plurality of features, and wherein the closure status is detected based on the closure probability.

6. The method of claim 5, wherein the closure status is detected by applying a classification threshold to the closure probability.

7. The method of claim 6, wherein the classification threshold includes multiple asymmetric decision thresholds to perform a decision hysteresis avoidance.

8. The method of claim 1, wherein the another time epoch is a current time epoch, and wherein the one or more time epochs end before the current time epoch.

9. The method of claim 1, wherein the one or more time epochs comprise a dynamic time window, and wherein a size of the dynamic time window is adjusted by adding or removing an additional time epoch until at least one criterion related to the probe data, the dynamic time window, or a combination thereof is met.

10. The method of claim 1, wherein the one or more time epochs comprise a static time window.

11. An apparatus for automatic road closure detection comprising:
    at least one processor; and
    at least one memory including computer program code for one or more programs,
    the at least one memory and the computer program code configured to, with the at least one processor, cause the apparatus to perform at least the following,
    retrieve a first set of probe data collected from a road link during one or more time epochs;
    retrieve a second set of probe data collected from the road link during another time epoch;

extract a plurality of features from the first set of probe data, the second set of probe data, or a combination thereof; and detect a closure status of the road link based on the extracted plurality of features.

12. The apparatus of claim 11, wherein the closure status is detected by applying a rule-based algorithm to the extracted plurality of features.

13. The apparatus of claim 12, wherein the rule-based algorithm combines the extracted plurality of features into one or more logical sentences and one or more associated evaluation criteria.

14. The apparatus of claim 11, wherein the closure status is detected by applying a machine-learning based algorithm.

15. The apparatus of claim 14, wherein the machine-learning based algorithm determines a closure probability based on the extracted plurality of features, and wherein the closure status is detected based on the closure probability.

16. A non-transitory computer-readable storage medium for automatic road closure detection, carrying one or more sequences of one or more instructions which, when executed by one or more processors, cause an apparatus to perform:

retrieving a first set of probe data collected from a road link during one or more time epochs;

retrieving a second set of probe data collected from the road link during another time epoch;

extracting a plurality of features from the first set of probe data, the second set of probe data, or a combination thereof; and detecting a closure status of the road link based on the extracted plurality of features.

17. The non-transitory computer-readable storage medium of claim 16, wherein the closure status is detected by applying a rule-based algorithm to the extracted plurality of features.

18. The non-transitory computer-readable storage medium of claim 17, wherein the rule-based algorithm combines the extracted plurality of features into one or more logical sentences and one or more associated evaluation criteria.

19. The non-transitory computer-readable storage medium of claim 16, wherein the closure status is detected by applying a machine-learning based algorithm.

20. The non-transitory computer-readable storage medium of claim 19, wherein the machine-learning based algorithm determines a closure probability based on the extracted plurality of features, and wherein the closure status is detected based on the closure probability.

* * * * *